United States Patent [19]
Shimizu et al.

[11] Patent Number: 5,514,311
[45] Date of Patent: May 7, 1996

[54] METHOD OF INJECTION CONTROL FOR INJECTION MOLDING MACHINE

[75] Inventors: Miyuki Shimizu; Syuichi Hokino; Hirofumi Ogihara, all of Nagano, Japan

[73] Assignee: Nissei Plastic Industrial Co., Ltd., Nagano, Japan

[21] Appl. No.: 358,553

[22] Filed: Dec. 14, 1994

[30] Foreign Application Priority Data

Dec. 15, 1993 [JP] Japan .................... 5-343677

[51] Int. Cl.$^6$ ................................. B29C 45/77
[52] U.S. Cl. .................. 264/40.1; 264/40.5; 264/328.1; 425/145; 425/149
[58] Field of Search .................... 264/40.1, 40.5, 264/328.1; 425/135, 145, 149, 542; 364/476

[56] References Cited

U.S. PATENT DOCUMENTS

| | | | |
|---|---|---|---|
| 4,851,170 | 7/1989 | Shimizu et al. | 264/40.5 |
| 4,954,301 | 9/1990 | Saeki et al. | 264/40.1 |
| 5,102,587 | 4/1992 | Kumamura et al. | 264/40.5 |
| 5,178,805 | 1/1993 | Yokota | 264/40.5 |
| 5,246,645 | 9/1993 | Tagawa et al. | 264/40.1 |

FOREIGN PATENT DOCUMENTS 5-44892  7/1993  Japan .

Primary Examiner—Jill L. Heitbrink

[57] ABSTRACT

Holding pressure-intended changeover speed Vh (provided, Vh≠0) lesser than final set speed Ve in preselected speed control pattern Xv is selected while from deceleration rate Rh according to which screw 2 is decelerated at the time of terminating final set speed Ve, holding pressure-intended changeover speed Vh and holding pressure-intended changeover position Sh, final deceleration start position Se in speed control pattern Xv, a segment of which extends, running through a point where holding pressure-intended changeover speed Vh and holding pressure-intended changeover position Sh is chosen; screw 2 is decelerated, following deceleration rate Rh when screw 2 arrives at final deceleration start position Se while injection control is in progress and when holding pressure-intended changeover position Sh or holding pressure-intended changeover speed Vh is reached, a shift is made to holding pressure control, whereby with even an electric motor-driven injection molding machine using a servo motor, a smooth shift from the injection process to the holding pressure process may be allowed; whereby it may become unnecessary to effect fine adjustment of a holding pressure-intended changeover position; and the quality of molded products and the productivity of injection molding machines may be improved.

6 Claims, 4 Drawing Sheets

METHOD OF INJECTION CONTROL FOR INJECTION MOLDING MACHINE

FIELD OF THE INVENTION

The present invention relates to a method of injection control for injection molding machines wherein injection control is effected by advancing a screw according to a preselected speed control pattern, and when the screw reaches a previously selected holding pressure-intended changeover position, holding pressure control is carried into practice, following a pressure control pattern chosen in advance.

DESCRIPTION OF THE RELEVANT ART

The conventional method of injection control in electric motor-driven injection molding machines, each installed with a servo motor as a drive source for screw forward movements used to take place wherein, as disclosed in Japanese Patent Publication No. HEI-5 (1993) —44892, according to a pre-selected speed control pattern, a screw is moved forward whereby molten plastic in a barrel cylinder is injected into a set of molds for filling therein, and when the screw reaches a precedently chosen holding pressure-intended changeover position, a shift is made to a holding pressure process in which the plastic filled within the molds is applied with a holding pressure, following a pressure control pattern which has been selected in advance.

Shown in FIG. 6 is one example respectively of a general screw position-responded speed control pattern and a general time-responded pressure control pattern, both being used to be applied thus far. Firstly, the injection process starts with advancing the screw from injection start position So, followed by accelerating thereof up to first set speed Vf, and when first set speed Vf is reached, said first set speed Vf is maintained up to first speed shift position Sf. Meanwhile, when first speed shift position Sf is reached, the screw is further accelerated up to second set speed Vm, and when second set speed Vm is attained, said second set speed Vm is kept unchanged up to second speed shift position Sm. Further, when second speed shift position Sm is reached, said screw is decelerated down to final set speed (third set speed) Ve, followed by the maintenance thereat upon the attainment thereto. Subsequently, immediately prior to holding pressure-intended shift position Sh, the screw is decelerated and then stopped thereat, followed by a shift from the injection process to the holding pressure process. In the pressure holding process, pressure control is done in a manner so that first set pressure Pf may be obtained, wherein when first set time tf goes by, a shift is made to final set pressure (second set pressure) Pe, and further, the elapse of second set time te coincides with terminating serial injection and holding pressure control. In this case, set speed, speed shift position, and holding pressure changeover position are feedback controlled by detecting the revolutions of a servo motor.

The conventional method of injection control used to take place, wherein with the inertia, etc. of a servo motor and a transmission mechanism taken into account, the screw is halted once at the holding pressure-intended changeover position through positioning control, followed by a shift to the holding pressure process. As a consequence, as is shown by an imaginary line in FIG. 5, when injection speed Vs declines to zero, injection pressure Ps falls, fluctuating temporarily, whereby molded products would have their quality affected, thus requiring fine adjustment of holding pressure-intended changeover position Sh.

Namely, as there takes place screw stroke control in the injection process, both the injection speed and the injection pressure (packing pressure) immediately prior to the completion of in-mold filling have their magnitudes decided, principally depending on holding pressure-intended changeover position Sh. Therefore, in the case with those molded products subject to suffering qualitative influence depending on the magnitudes of the injection speed or pressure prevailing immediately before the completion of in-mold filling, more precisely, for such molded products which readily have a weld line generated due to insufficiency of injection speed or pressure and which likewise undergo the emergence of a flash owing to the excess of injection speed or pressure, fine adjustment is necessary to set optimal holding pressure-intended changeover position Sh. Moreover, molding conditional setting subject to this fine adjustment requires trial and error through test injection molding over many cycles even for a skilled operator, resulting in not only decreasing the productivity of each machine but also causing the difficulty of obtaining quality molded products.

SUMMARY OF THE INVENTION

Though directed for electric motor-driven type injection molding machines using a servo motor each, an object of the present invention is to provide a method of injection control for injection molding machines, which method is devised to prevent the fluctuation of pressure emerging at the time of a shift from the injection process to the holding pressure process, whereby a smooth shift may be made from the injection process to the holding pressure process.

Another object of the present invention is to provide a method of injection control for injection molding machines, which method is devised to render unnecessary to undertake fine adjustment of the holding pressure-intended changeover position, whereby the quality of molded products and the productivity may be improved.

To achieve these objects, the present invention is embodied such as follows, wherein injection control is effected by advancing screw 2, following pre-selected speed control pattern Xv, and in doing holding pressure control according to precedently chosen pressure control pattern Xp when screw 2 reaches holding pressure-intended changeover position Sh which has been selected in advance, holding pressure-intended changeover speed Vh (provided, Vh≠0) lesser than final set speed Ve in speed control pattern Xv is pre-selected, and from deceleration rate Rh according which screw 2 is decelerated at the time of terminating final set speed Ve, holding pressure-intended changeover speed Vh, and holding pressure-intended changeover position Sh, final deceleration start position Se in speed control pattern Xv, a segment of extends running through a point where holding pressure-intended changeover speed Vh and holding pressure-intended changeover position Sh match is selected, and when final deceleration start position Se is reached while injection control is under way, screw 2 is decelerated according to deceleration rate Rh and subsequently when screw 2 arrives at holding pressure-intended changeover position Sh or attains holding pressure-intended changeover speed Vh, and a shift is made to holding pressure control. In this case it is desired that holding pressure-intended changeover speed Vh be selected at less than 30% final set speed Ve. Deceleration rate Rh is a ratio (b/a) between travel "a" of screw 2 during deceleration and speed reduction "b" reduced during said travel of the screw. The present invention is applied particularly to those electric motor-driven injection molding machines wherein each screw 2 is moved forward by screw drive 4 with servo motor 3.

In view of this, if a holding pressure-intended changeover speed Vh which is smaller than the terminating final set speed Ve in speed control pattern Xv, is selected, since speed reduction rate Rh when screw 2 reduces speed at the time of termination of basic speed control pattern Xv and terminating final set speed Ve, is set in advance, a speed control pattern Xv running through a point where holding pressure-intended changeover speed Vh and holding pressure-intended position Sh match, is obtained from such known data as the speed reduction rate Rh, holding pressure-intended changeover speed Vh and holding pressure-intended changeover position Sh, while a terminating speed reduction starting position of the speed control pattern Xv can be also obtained.

Thus, injection control takes place with screw 2 getting advanced according to speed control pattern Xv, whereby molten plastic is injected into the molds for filling therein, wherein when screw 2 arrives at final deceleration start position Se, said screw 2 is decelerated according to said deceleration rate Rh, and further when screw 2 reaches holding pressure-intended changeover position Sh or attains holding pressure-intended changeover speed Vh, if a shift is made to the holding pressure process in which holding pressure is effected according to preselected pressure control pattern Xp, whereby immediately prior to stopping screw 2, namely midway in the deceleration started from final deceleration start position Se, the pressure holding process is put into practice, with serial control thus getting implemented from the injection process to the holding pressure process. Therefore, according to the present invention, even such an electric motor-driven injection molding machine in which screw 2 is advanced by screw drive 4 with a servo motor 3 is allowed to make a smooth shift from the injection process to the holding pressure process and prevent the occurrence of pressure fluctuations. Further, with said injection molding machine, it becomes unnecessary to effect fine adjustment of holding pressure-intended changeover position Sh, resulting in greatly decreasing the effect which molded products undergo over their quality due to the inter-molding cycle melt plastic quantitative fluctuation and plasticized conditional variation.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Next, one preferred embodiment of the present invention is quoted hereunder and described in detail, referring to the accompanying drawings.

Figure 3:
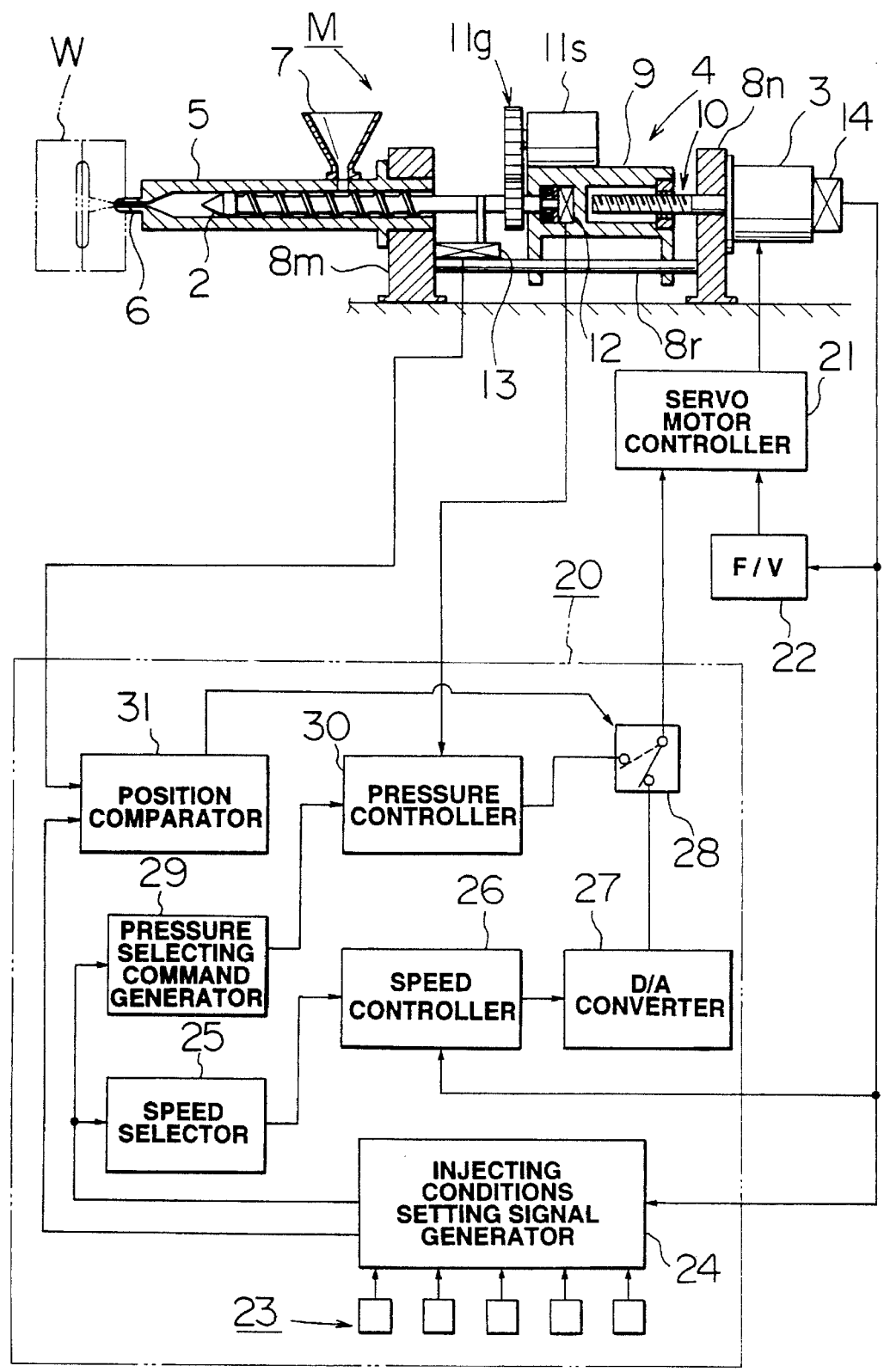
FIG. 3 is a block schematic diagram of an injection molding machine to which said method of injection control is applicable.

Now with reference to FIG. 3, the constitution and the operation of an injection molding machine are described to which the method of injection control according to the present invention is applicable. M in the figure refers to an injection unit of the injection molding machine. Injection unit M is furnished with barrel cylinder 5 having injection nozzle 6 at the fore end and hopper 7 at the rear end while screw 2 is inserted incorporated in barrel cylinder 5. Meanwhile, 8m and 8n denote respective support plates provided at the fore and rear on the machine body; the rear end of barrel cylinder 5 is held by fore support plate 8m while the rear end of screw 2 is coupled to screw drive 4 borne by support plates 8m and 8n. With regard to screw drive 4, 8r refers to a guide rail which is horizontally mounted between support plates 8m and 8n, to which guide rail 8r, slider block 9 is mounted in a manner that said block may be moved back and forth. On the other hand, to rear support plate 8n, servo motor 3 for injection is locked, the drive shaft of which is coupled to the rear end of slider block 9 by way of ball screw mechanism 10 while the fore end of slider block 9 is connected to rear end of screw 2. In this case, screw 2 has its coupling done with provision of not only free rotatability but also restriction of forward/backward movements. Thus, the rotations of servo motor 3 are converted by ball screw mechanism 10 to forward/backward movements, whereby screw 2 is moved back and forth. With reference to FIG. 3, 11s stands for a measuring-use servo motor which is locked to slider block 9, 11g for a transmission gear mechanism to transmit the rotations of servo motor 11s to screw 2, W for a set of molds illustrated in an imaginary line.

Further, 12 refers to a load cell (pressure sensor) which is provided between the rear end of screw 2 and slider block 9 to detect the back pressure of screw 2, 13 to a linear sensor (position detector) to detect the position of screw 2, 14 to an encoder to output a position and a speed detected signal of screw 2 by detecting the revolutions of servo motor 3.

Additionally, 20 represents a main control unit, 21 a servo motor controller, 22 an F/V converter to convert a pulse signal output from encoder 14 to a speed detected signal (analog signal). Main control unit 20 is furnished with setting means 23 to select first set speed Vf, second set speed Vm, final set speed (third set speed) Ve, first speed shift position Sf, second speed shift position Sm, final deceleration start position Se, holding pressure-intended changeover position Sh, acceleration rate Ru, deceleration rate Rd, first set pressure Pf, final set pressure (second set pressure) Pe, first set time tf, second set time te, etc., which are described later, wherein which setting means 23 are connected to injecting conditions setting signal generator 24. In this case, according to the present invention, setting means 23 each include the respective functions to select deceleration rate Rh in compliance with which screw 2 is decelerated when holding pressure-intended changeover speed Vh and final set speed Ve are terminated, and final deceleration start position Se. Injecting conditions setting signal generator 24 generates and outputs an injecting conditions setting signal on the basis of the pulse signal representing the position of screw 2 and which is output from encoder 14.

Further 25 refers to a pulse distributor-equipped speed selector which provides injection process screw position-responded speed control pattern Xv, following the injection conditions setting signal which injecting conditions setting signal generator 24 outputs for injection control, and outputs a pulse signal corresponding to the above-mentioned speed control pattern Xv to speed controller 26 installed with a deviation counter. The deviation counter incorporated in speed controller 26 counts up the number of pulse signals from speed selecting command generator 25 and counts down the number of pulse signals from encoder 14, and the speed controller 26 gives the amount of deviation based on the count of said counter to D/A converter 27 which converts said amount of deviation to a speed control signal (analog signal) which is then fed to signal selector 28.

On the other hand, 29 denotes a pressure selecting command generator which provides holding pressure process time-responded pressure control pattern Xp on the basis of the injecting conditions setting signal which injecting conditions setting signal generator 24 outputs for holding pressure control, and outputs a pressure selecting signal corresponding to said pressure control pattern Xp to pressure controller 30. Pressure controller 30 compares the pressure selecting signal from pressure selecting command generator 29 with the pressure detected signal output from load cell 12 and calculates for a pressure control signal which is subsequently fed to signal selector 28.

Position comparator 31 compares a position setting signal associated with holding pressure-intended changeover position Sh and which is output from injecting conditions setting signal generator 24 with a position detected signal output from linear sensor 13, and outputs a holding pressure-intended changeover signal to signal selector 28 when screw 2 reaches holding pressure-intended changeover position Sh.

Therefore, when injection control is progressing, a speed control signal from D/A converter 27 is fed to servo motor controller 21 via signal selector 28, and said servo motor controller 21 feedback-controls the injection speed according to speed control pattern Xv so that said speed control signal and a speed detected signal fed from F/V converter 22 may agree with each other. Meanwhile, when holding pressure control is under way, a pressure control signal from pressure controller 30 is fed via signal selector 28 to servo motor controller 21, whereby the holding pressure is feedback-controlled according to holding pressure control pattern Xp.

Next, referring to FIGS. 1 through 4, the method of injection control to which the present invention relates is described.

Figure 1:
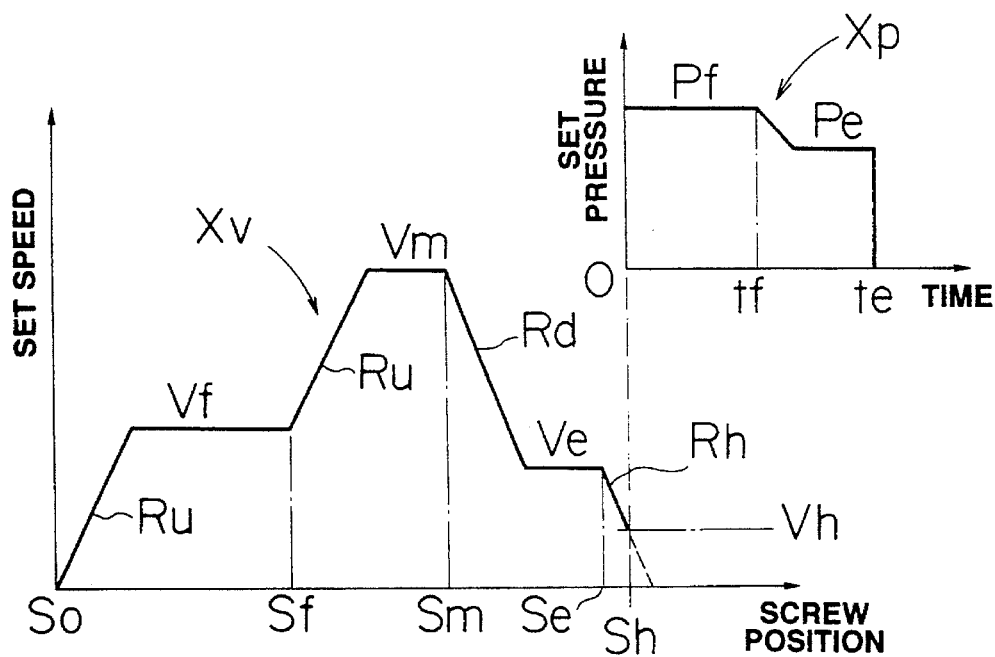
FIG. 1 presents respective characteristic diagrams of the injection and the pressure control pattern according to the method of injection control to which the present invention relates.

FIG. 1 shows injection process screw position-responded speed control pattern Xv and injection process time-responded pressure control pattern Xp. Firstly, first set speed Vf, second set speed Vm, final set speed (third set speed) Ve, first speed shift position Sf, second speed shift position Sm, final deceleration start position Se, holding pressure-intended changeover position Sh, acceleration rate Ru, deceleration rate Rd, first set pressure Pf, final set pressure (second set pressure) Pe, first set time tf, and second set time te are selected by respective setting means 23.

On the other hand, a holding pressure-intended changeover speed lesser than final set speed Ve in position-responsed speed control pattern Xv is selected by setting means 23 but it is desired that holding pressure-intended changeover speed Vh (provided, Vh≠0) below 30% (optimally 5 through 10%) final set speed Ve be selected, and deceleration rate Rh according to which screw 2 is decelerated when final set speed Ve is terminated. In this case, deceleration rate Rh is a ratio between travel "a" of screw 2 during deceleration and speed reduction "b" decreased during said travel of the screw; namely Rh is selected in b/a. For the convenience of simplicity, FIGS. 1 and 2 have no Vh depicted under said conditions.

Figure 2:
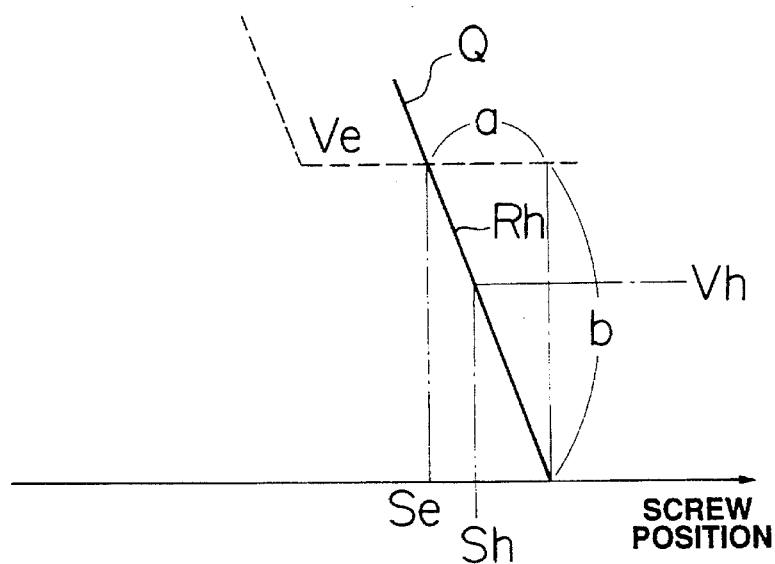
FIG. 2 is a principle illustrative diagram of said method of injection control.

Thus, as shown in FIG. 2, since depending on the injecting conditions designated for selecting deceleration rate Rh, holding pressure-intended changeover speed Vh, and holding pressure-intended changeover position Sh, line Q passing a point where holding pressure-intended changeover speed Vh and holding pressure-intended changeover position Sh match is specified as the deceleration characteristic at the time of terminating final set speed ve in speed control pattern Xv, the point of intersection between final set speed Ve and line Q can be obtained as final deceleration start position Se.

Figure 4:
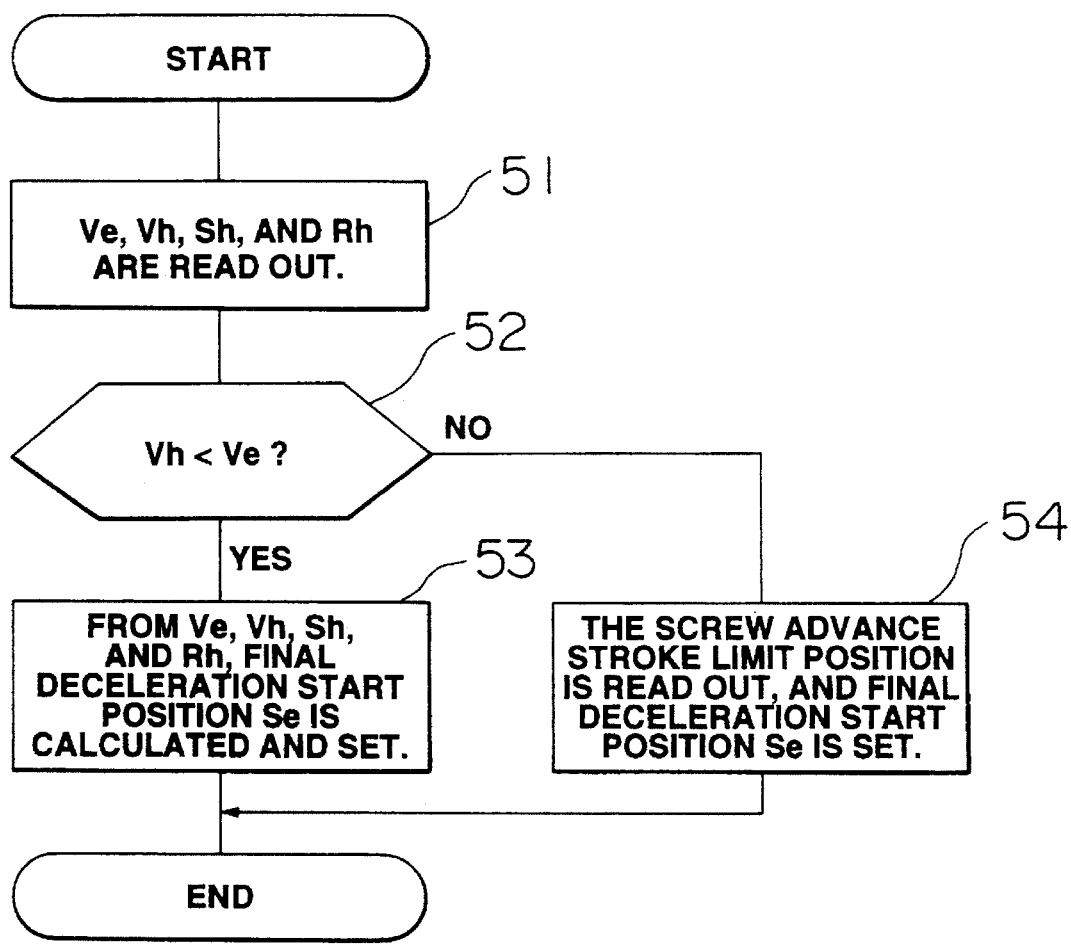
FIG. 4 is a flowchart for the case where the final deceleration start position which is selected according to said method of injection control is automatically set.

FIG. 4 is a flowchart for the case where final deceleration start position Se is automatically selected. In this case, pressing respective automatic setting keys takes place with reading out (step 51) final set speed Ve, holding pressure-intended changeover speed Vh, holding pressure-intended changeover position Sh and deceleration rate Rh from the memory in which they have been pre-selected for storage. Then, holding pressure-intended changeover speed Vh and final set speed Ve are compared (step 52) with one another. If there is found a relation of Vh<Ve, final deceleration start position Se is automatically calculated from final set speed Ve, holding pressure-intended changeover speed Vh, holding pressure-intended changeover position Sh and deceleration rate Rh in preparation for setting (step 53). On the other hand, when a relation of Vh≧Ve is confirmed, a pre-selected screw advance stroke limit position is read out, whereby final deceleration start position Se is set. Meanwhile, when a relation of Vh≧Ve occurs, there must have been some error in setting Vh, etc.

In the meantime, when injection control (injection process) is in progress, screw 2 is moved forward according to speed control pattern Xv for injection. More precisely, Screw 2 advances from injection start position So and is accelerated according to acceleration rate Ru up to first set speed Vf. Subsequently when the screw speed reaches first set speeds Vf, said first set speed Vf is maintained up to first speed shift position Sf. Then, when first speed shift position Sf is reached, the screw is again accelerated according to acceleration rate Ru up to second set speed Vm. Thereafter, when second set speed Vm is attained, said second set speed Vm is kept unchanged up to second speed shift position Sm. Further, when second speed shift position Sm is reached, the screw is decelerated according to deceleration rate Rd down to final set speed (third set speed) Ve, with said screw being maintained at final set speed Ve upon its attainment thereat. And when screw 2 arrives at final deceleration start position Se pre-selected according to the present invention, screw 2 is decelerated according to said deceleration rate Rh. Further, when screw 2 reaches holding pressure-intended changeover position Sh or holding pressure-intended changeover speed Vh, a shift is made to the holding pressure process to effect the holding of pressure according to pressure control pattern Xp.

Figure 5:
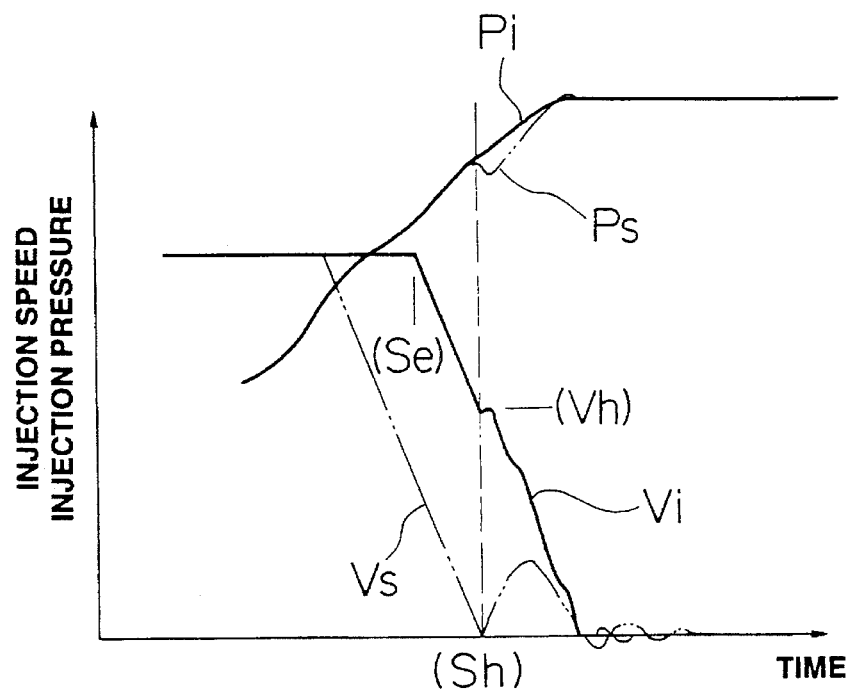
FIG. 5 is a characteristic diagram of injection speed and pressure controlled according to said method of injection control.
Figure 6:
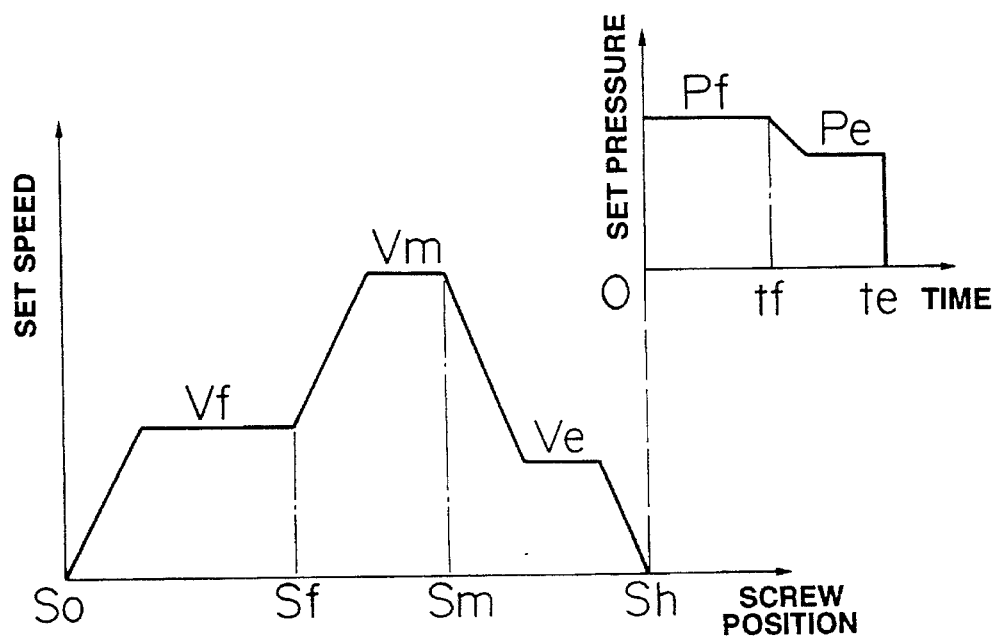
FIG. 6 presents respective characteristic diagrams of the injection and pressure control pattern according to the conventional general method of injection control.

With this shift step completed, immediately prior to halting screw 2, namely, midway in the deceleration thereof beginning with final deceleration start position Se, a changeover is made to pressure control in the holding pressure process. Thus, even with the electric motor-driven injection molding machine wherein screw 2 is moved forth with screw drive 4 having servo motor 3, a smooth shift is allowed from the injection process to the holding pressure process without the fluctuations respectively of injection pressure Pi and injection speed Vi given in a full line as shown in FIG. 5, with the fluctuation of injection pressure Ps (given in an imaginary line) prevented which has thus far been witnessed at the stage of a shift from the injection process to the holding pressure process. The result is that it becomes unnecessary to effect fine adjustment of holding pressure-intended changeover position Sh, and it also becomes feasible to improve the quality of molded products and the productivity of the machine.

Further, the holding pressure process takes place, wherein pressure control is done in a manner that first set pressure Pf may be attained, while the passage of first set time tf concurs with a shift to second set pressure Pe and the further passage of second set time te coincides with terminating serial injection and holding pressure control.

According to the method of injection control to which the present invention relates, there occurs no trouble unlike with the conventional method wherein when the screw approaches as close as holding pressure-intended changeover position Sh, the speed command has its numeric value lessened, whereby the force of driving the screw forward becomes insufficient, resulting in failure of moving forth the screw up to its normal forward stroke limit, with a shift to the holding pressure process getting rendered unfeasible.

Though one preferred embodiment of the present invention has been described in the foregoing, it must be understood that the present invention is in no way limited thereto. Selecting "final deceleration start position" for example is based on the concept covering other factors enabling to specify a final deceleration start position such as selecting a screw stroke ultimate position. Further, not to mention, the concept of noting "holding pressure-intended changeover position" is the understanding to take note of "position" itself and has a scope covering the case where a positional presentation is made, using such physical quantities other than "time", "pressure", etc. each of which is convertible to "position." In addition, the present invention is also applicable to a preplastication type electric motor driven injection molding machine. Further, the present invention may have certain particular constitutions, methodic details, etc. altered or modified optionally within the spirit and the scope of the invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A method of injection control for injection molding machines, wherein injection control is effected by advancing a screw according to a pre-selected speed control pattern, and holding pressure control is implemented, following a pressure control pattern which is chosen in advance, when the screw reaches a pre-selected holding pressure-intended changeover position Sh, wherein a holding pressure-intended changeover speed Vh, provided Vh≠0 and is less than a final set speed Ve in the pre-selected speed control pattern is selected, a deceleration rate Rh according to which the screw is decelerated at the time of terminating final set speed Ve is selected, said holding pressure changeover speed Vh and said holding pressure-intended changeover position Sh are selected, a final deceleration start position Se in said speed control pattern is selected, a segment of said speed control pattern extends, running through a point where said holding pressure-intended changeover speed Vh and said holding pressure-intended changeover position Sh match the screw is decelerated, following said deceleration rate Rh when said screw arrives at final deceleration start position Se while injection control is under way and a shift is made to holding pressure control when said holding pressure-intended changeover position Sh or said holding pressure changeover speed Vh is reached.

2. The method of injection control for injection molding machines as claimed in claim 1, wherein final deceleration start position Se is automatically selected from said deceleration rate Rh, said holding pressure-intended changeover speed Vh and said holding pressure-intended changeover position Sh.

3. The method of injection control for injection molding machines as claimed in claim 1, wherein said method is applied to electric motor-driven injection molding machines, each advancing a screw by a screw drive having a servo motor.

4. The method of injection control for injection molding machines as claimed in claim 3, wherein a screw position detected signal and a screw speed detected signal are obtained through detecting the revolutions of the servo motor with an encoder applied.

5. The method of injection control for injection molding machines as claimed in claim 1, wherein holding pressure-intended changeover speed Vh is selected at less than 30% final set speed Ve.

6. The method of injection control for injection molding machines as claimed in claim 1, wherein deceleration rate Rh is a ratio between travel "a" of the screw during deceleration and speed reduction "b" reduced during said travel of the screw.

* * * * *